United States Patent Office 3,733,373
Patented May 15, 1973

3,733,373
POLY-1-BUTENE RESINS
Richard L. McConnell and Doyle A. Weemes, Kingsport, Tenn., assignors to Eastman Kodak Company, Rochester, N.Y.
No Drawing. Filed Apr. 1, 1971, Ser. No. 130,518
Int. Cl. C08f 29/12
U.S. Cl. 260—897 A          12 Claims

ABSTRACT OF THE DISCLOSURE

Improved molding resins comprising a blend of (A) about 70 to 99.9% by weight of a substantially crystallizable polymer of 1-butene selected from homopolymers of 1-butene and copolymers of 1-butene and a dissimilar α-olefin of 2 to 12 carbon atoms, said α-olefin being present in said copolymer in a concentration of up to about 20% by weight and (B) about 0.1 to 30% by weight of a polymer of ethylene selected from homopolymer of ethylene and copolymer of ethylene and a higher α-olefin, said higher α-olefin being present in said copolymer in a concentration of up to about 10% by weight, said polymer of ethylene having a density of at least 0.93.

---

This invention relates to improved molding resins based on 1-butene homo- and copolymers. More particularly, the invention is directed to 1-butene homo- or copolymers having improved moldability when blended with polyethylene or copolymers of ethylene.

The usefulness of 1-butene polymers as molding resins is seriously limited since they have a tendency to crystallize out of the melt as a soft, clear plastic commonly referred to as Form II and then gradually change to a more thermodynamically stable form commonly referred to as Form I. During this transformation, the molded objects are tacky and warp and become cloudy. Another problem associated with the molding of poly-1-butene is its low crystallization temperature. That is, the melt super-cools drastically prior to crystallization (melting point 130–135° C.; crystallization point 76–77° C.). Thus, molded objects or parts of 1-butene polymers are very soft and the knockout pins puncture or penetrate the part.

In attempts to alleviate these limitations of 1-butene polymers, nucleating agents commonly employed with polypropylene such as a combination of aluminum isopropoxide and p-tert-butylbenzoic acid or the dibutylammonium salt of p-tert-butylbenzoic acid have been used. Unfortunately, these nucleating agents were found to have little effect on either the type of crystallinity formed initially in poly-1-butene or the rate of change of Form II to Form I crystallinity.

One object of the invention, therefore, is to provide 1-butene homo- and copolymer compositions having increased crystallization temperatures.

Another object of the invention is to provide an improved process for the shaping into articles of 1-butene homo- and copolymers.

Thus, an additional object of the invention is to provide 1-butene homo- and copolymers which may be molded and then removed from the mold without warpage or sticking to the mold or damage from knockout pins.

These and other objects of the invention are obtained by homogeneously blending about 0.1 to 30% by weight of an ethylene polymer having a density of at least 0.93 with 70 to 99.9% by weight of a substantially crystallizable 1-butene polymer. It has been found that the addition of these amounts of ethylene polymer will substantially increase the crystallization point of polymers of 1-butene. For instance, in the case of poly-1-butene, the ethylene polymer will raise the crystallization point about 20° C. That is to say, the compositions containing the ethylene polymer crystallize at about 93–96° C. instead of about 75–76° C. Moreover, the compatibility of the blend of ethylene polymer and 1-butene polymer is quite good so that the crystallinity-dependent properties of the 1-butene polymer are not adversely affected.

In addition to the increased crystallization temperatures, it is found that the spherulite size of the 1-butene polymer in the polyolefin blend of the invention is extremely small which indicates that the ethylene polymer component of the invention is nucleating the 1-butene polymer effectively. Actual molding operations have demonstrated that the polyolefin blends of the invention molded extremely well, released from the mold quite readily and the molded parts were not punctured or dented by knockout pins.

The crystallizable 1-butene polymer of the invention may be a homopolymer of 1-butene or a copolymer including random, block and graft copolymers of 1-butene and a polymerizable, dissimilar α-olefin of 2 to 12 carbon atoms such as ethylene, propylene, 1-pentene, 1-hexene, 1-heptene, 1-octene, 1-dodecene, 4-methyl-1-pentene, 3-methyl-1-butene, vinylcyclohexane and the like. "Crystallizable" polymers are those which have a stereo-regular molecular arrangement that enables them to solidify from a melt into a highly crystalline structure. The solidified crystalline 1-butene polymers have a high degree of crystallinity, usually at least 50%, often at least 70%, as determined by X-ray analysis or other comparable means.

Poly-1-butene is conventionally made by the polymerization of 1-butene to stereoregular polymer in the presence of a conventional coordination catalyst. Such catalysts are, for example, combinations of violet titanium trichloride with organo-aluminum compounds such as trialkylaluminums or dialkylaluminum halides. Specific examples include $Et_3Al/TiCl_3$, $(IsoBu)_3Al/TiCl_3$, $$Et_2AlCl/TiCl_3, Et_2AlI/TiCl_3$$

and the like. High temperature catalysts such as $LiAlH_4/TiCl_3$ may also be used. The polymerizate from the polymerizations may be solvent extracted, for example, with methyl isobutyl ketone, diethyl ether and the like to remove any amorphous fraction and leave essentially crystallizable polymer or, if desired, the total polymer formed, i.e., the unseparated amorphous and crystallizable portions, may be used. The total polymer thus formed will be substantially crystallizable while containing some small amount of amorphous polymer.

Other operable catalysts include the three-component catalysts such as those derived from violet titanium trichloride in combination with alkylaluminum dihalide or alkylaluminum sesquihalide and third components such as hexamethylphosphoric triamide, dimethylformamide, tributylamine and the like. Specific examples include $1/0.6/1$ $EtAlCl_2/(Me_2N)_3P(O)/TiCl_3$, $2/1/3$ $Et_3Al_2Cl_3/(Me_2N)_3P(O)/TiCl_3$ and the like. Other titanium trihalide compounds which may be used include violet titanium trichloride which contains aluminum chloride co-crystallized with the $TiCl_3$, titanium tribromide, or titanium triiodide. Use of these three-component catalyst systems provides a highly crystallizable polymer containing essentially no amorphous material.

Similarly, suitable copolymers of 1-butene are made in the presence of conventional coordination catalyst to form a substantially crystallizable product. The molecular weight of the 1-butene polymer of the invention, as measured by its inherent viscosity in Tetralin at 145° C., will generally range from about 0.2 to about 5.0.

The ethylene polymer component of the blend of the invention has a density of at least 0.93 and thus may be either medium or high density ethylene polymer prepared by any of the well-known polymerization processes of the art. Medium density ethylene polymers generally have a density of about 0.93 to 0.95 g./cc. and may be prepared, for example, by high pressure polymerizations involving free radical initiators. The high density ethylene polymers are generally those having a density of greater than 0.95 g./cc. and may be prepared, for instance, by the polymerization processes using supported chromium oxide catalysts or the coordination catalyst described above. The inherent viscosity of the ethylene polymers in Tetralin at 145° C. may vary from about 0.05 to 5, preferably about 0.1 to 2.0. The higher molecular weight ethylene polymers usually have a melt index of about 0.1 to 20, most often about 1.0 to 10 as measured by the standard ASTM D 1238 method. However, ethylene polymers of low molecular weight having melt viscosities of 50 to 200,000 centipoises at 190° C. may be employed and are just as operable. Although homopolymer of ethylene is the preferred ethylene polymer component, the copolymers including random, graft and block copolymers of ethylene and up to 20% by weight of a higher 1-olefin, usually of 3 to 8 carbon atoms such as propylene, 1-butene, 1-pentene, 1-hexene, etc. may also be used, if desired.

The blending of the 1-butene polymer component and ethylene polymer component may be accomplished in many ways known to those skilled in the art. Thus, a physical mixture of the polymer components in powder or pellet form can be blended together using conventional blending equipment which includes Banbury mixers, Brabender Plastographs, hot rolls, extruders and the like. The blending or processing temperatures will vary depending primarily on the molecular weight and melt index of the particular 1-butene polymer. Normally the processing temperatures will fall in the range of about 100 to 250° C.

As in other polyolefin compositions, other additives commonly incorporated such as stabilizers, antioxidants, brightners, plasticizers, pigments fillers, and the like may be included in the composition of the invention.

The blends of the invention may be shaped into desired articles by shaping processes well known in the art as, for example, molding techniques including compression molding, injection molding, extrusion molding and the like.

The following examples are included to further illustrate the present invention.

EXAMPLE 1

39.2 grams of crystallizable poly-1-butene (melt index 0.3) is blended with 0.8 gram of high density polyethylene (density 0.965 g./cc.; melt index 0.6) on a Brabender Plastograph at 140° C. The mixing is continued for 6 minutes at this temperature under a nitrogen atmosphere. The melt index of this blend is 0.3. The following Differential Scanning Calorimeter (DSC) melting point and crystallization point (C.P.) data are obtained. The heating rate for the DSC thermogram is 20° C. per minute and the cooling rate is 5° C. per minute.

| Material | M.P., °C. | C.P., °C. |
|---|---|---|
| Poly-1-butene/polyethylene blend | 135 | 93 |
| Poly-1-butene | 134 | 75 |
| Polyethylene | 135 | 120 |

The increased crystallization temperature of the blend demonstrates that the polyethylene is nucleating the poly-1-butene.

EXAMPLE 2

Additional blends of polyethylene with crystallizable poly-1-butene are made in a manner similar to that described in Example 1. The following table indicates the amount of polyethylene present and the melting point and crystallization point data obtained from DSC thermograms.

| Polyethylene concn., wt. percent | Melt index of blend | M.P., °C. | C.P., °C. |
|---|---|---|---|
| 30 | 0.3 | 134 | 122, 88 |
| 20 | 0.3 | 129 | 122, 87 |
| 10 | 0.2 | 129 | 91 |
| 5 | 0.2 | 130 | 95 |
| 1 | 0.2 | 134 | 92 |
| 0.5 | 0.2 | 130 | 91 |

EXAMPLE 3

Two hundred pounds of a blend of crystallizable poly-1-butene having a melt index of 0.3 and 2% high density polyethylene (density 0.965 g./cc.; melt index 0.6) stabilized with 0.1% dilauryl thiodipropionate and 0.1% dioctadecyl-p-cresol are prepared in a Banbury mixer at a temperature of 140° C. This composition is injection molded in a Reed Prentice molding machine and the molded parts are readily ejected from the machine without puncture. The appearance of the molded objects is quite good. Typical parts which are molded include cups, combs, salad bowls, tensile specimens and pen barrels.

EXAMPLE 4

A blend of crystallizable poly-1-butene containing 20% high density polyethylene is prepared in a manner similar to that described in Example 3. The blend has a melt index of 0.3. This composition molds well in the Reed Prentice molding machine and the objects are removed from the mold without warpage or damage. The objects have a good glossy appearance and good physical properties.

EXAMPLE 5

A crystallizable 10/90 propylene/1-butene copolymer having a melt index of 0.1 is blended with 2% polyethylene (density 0.965 g./cc.; melt index 5.3) in a manner similar to that described in Example 3. This blend molds well and the molded parts are readily removed from the injection molding machine. The parts are extremely tough and have good physical properties.

EXAMPLE 6

Blends of polyethylene with crystallizable poly-1-butene or propylene/1-butene copolymers are prepared according to the procedure described in Example 1. The blends contain 2% polyethylene and are identified in the table below. The melt index of the components of the blends and DSC thermogram data on the blends are summarized in the following table.

| 1-butene polymer | Melt index | Polyethylene | Melt index | DSC data M.P., °C. | DSC data C.P., °C. |
|---|---|---|---|---|---|
| (1) 5/95 propylene/1-butene copolymer. | 0.34 | High density polyethylene (density 0.965 g./cc.). | 0.6 | 134 | 88 |
| (2) 15/85 propylene/1-butene copolymer. | 1.2 | do | 0.6 | 123 | 82, 59 |
| (3) Poly-1-butene | 200 | do | 0.2 | 130 | 94 |
| (4) Poly-1-butene | 0.1 | Low viscosity polyethylene (density 0.965 g./cc.). | 2,000 cp. at 190° C. | 132 | 92 |
| (5) Poly-1-butene | 6,000 cp. at 190° C. | do | 4,000 cp. at 190° C. | 127 | 89 |
| (6) Poly-1-butene | 10 | do | 40,000 cp. at 190° C. | 130 | 92 |

Similar increases in crystallization point are achieved when 98/2 ethylene/1-butene copolymers such as, for example those having: (1) a density of 0.95 g./cc. and a melt index of 0.2; (2) a density of 0.95 g./cc. and a melt index of 0.7; (3) a density of 0.95 g./cc. and a melt index of 5.0; or (4) a low viscosity 98/2 ethylene/1-butene copolymer having a melt viscosity of 10,000 cp. at 190° C., are blended with the 1-butene polymers instead of the homopolymer of ethylene.

EXAMPLE 7

Blends of crystallizable poly-1-butene (melt index 0.3) with high density polyethylene having a density of 0.965 g./cc. and a melt index of 0.6 are prepared in a Brabender Plastograph at 140° C. under a nitrogen atmosphere. Tensile specimens are molded in a Watson-Stillman injection molding machine at 350° F. and the samples are aged for 7 days prior to the determination of physical properties. The properties obtained are summarized in the following table.

| Polyethylene conc., wt. percent | 0 | 5 | 10 | 20 | 30 |
|---|---|---|---|---|---|
| Melt index | 0.3 | 0.22 | 0.24 | 0.27 | 0.29 |
| Hardness, Rockwell R | 59 | 53 | 49 | 36 | 45 |
| Hardness, Durometer D | 66 | 66 | 66 | 65 | 65 |
| Tensile break strength, p.s.i. | 13,700 | 10,000 | 12,000 | 11,000 | 10,600 |
| Elongation, percent | 20 | 30 | 18 | 29 | 26 |
| Stiffness, p.s.i. | 162,000 | 154,000 | 131,000 | 137,000 | 133,000 |
| Impact strength, notched Izod at 23° C | 5.56 | ¹1.6 | ¹3.02 | ¹3.02 | 1.76 |

¹ Hinge break.

These data demonstrate that the blends of poly-1-butene containing polyethylene have good moldability and the presence of the polyethylene does not adversely affect the toughness or stiffness of the poly-1-butene.

The following example is included to demonstrate the importance of employing an ethylene polymer component having a density of at least about 0.93 g./cc.

EXAMPLE 8

In a manner similar to that described in Example 1, 2% by weight of a low density (0.918 g./cc.) polyethylene having a melt index of 0.3 is blended with poly-1-butene having a melt index of 0.3. The following melting point and crystallization point data are obtained on the blend and poly-1-butene alone.

| Material | M.P., °C. | C.P., °C. |
|---|---|---|
| Poly-1-butene/low density P.E. blend | 115 | 74 |
| Poly-1-butene | 134 | 75 |

These data demonstrate that low density polyethylene does not increase the crystallization point of poly-1-butene.

The blends of this invention provide a readily moldable plastic having the physical properties of poly-1-butene. These blends can be extruded, compression molded, mechanically milled, cast or molded as desired. These blends can be molded into a variety of shapes such as film, fibers, toys, glass bottles, pipe and the like.

The invention has been described in detail with particular reference to preferred embodiments thereof, but it will be understood that variations and modifications can be effected within the spirit and scope of the invention.

We claim:

1. A homogeneous blend comprising (A) about 70 to 99.9% by weight of a substantially crystallizable polymer of 1-butene selected from homopolymers of 1-butene and copolymers of 1-butene and a polymerizable dissimilar α-olefin of 2 to 12 carbon atoms, said α- olefin being present in said copolymer in a concentration of up to about 20% by weight and (B) about 0.1 to 30% by weight of a polymer of ethylene selected from a homopolymer of ethylene and copolymer of ethylene and a higher α-olefin, said higher α-olefin being present in said copolymer in a concentration of up to about 10% by weight, said polymer of ethylene having a density of at least 0.93.

2. The polyolefin blend of claim 1 wherein the 1-butene polymer is a homopolymer of 1-butene.

3. The polyolefin blend of claim 1 wherein the polymer of ethylene is a homopolymer of ethylene.

4. The polyolefin blend of claim 1 wherein the polymer of ethylene is a copolymer of ethylene and a higher α-olefin.

5. The polyolefin blend of claim 1 wherein the 1-butene polymer is a homopolymer of 1-butene and the polymer of ethylene is a homopolymer of ethylene.

6. The polyolefin blend of claim 1 wherein the polymer of 1-butene is a copolymer of 1-butene and propylene wherein the concentration of propylene in the copolymer is about 5 to 15% by weight.

7. A molded article of the polyolefin blend of claim 1.

8. A molded article of the polyolefin blend of claim 5.

9. A method of improving the molding of crystallizable polymers of 1-butene selected from homopolymers of 1-butene and copolymers of 1-butene and a polymerizable, dissimilar α-olefin of 2 to 12 carbon atoms, said α-olefin being present in said copolymer at a concentration of up to about 20% by weight which comprises blending into said crystallizable polymer of 1-butene prior to shaping about 0.1 to 30% by weight of a polymer of ethylene selected from homopolymers of ethylene and copolymers of ethylene and a higher α-olefin, said higher α-olefin being present in said copolymer at a concentration of up to about 10% by weight, said polymer of ethylene having a density of at least 0.93 and subjecting the resulting blend to shaping.

10. The method of claim 9 wherein the polymer of 1-butene is a homopolymer of 1-butene.

11. The method of claim 9 wherein the polymer of ethylene is a homopolymer of ethylene.

12. The method of claim 9 wherein the polymer of 1-butene is a copolymer of 1-butene and propylene wherein the concentration of propylene in the copolymer is about 5 to 15% by weight.

References Cited

UNITED STATES PATENTS

| 3,634,551 | 1/1972 | Stancell et al. | 260—897 A |
| 3,050,497 | 8/1962 | Young | 260—45.5 |
| 3,250,825 | 5/1966 | Martinovich | 260—897 |

FOREIGN PATENTS

| 677,933 | 1/1964 | Canada | 260—Dig. 35 |

MURRAY TILLMAN, Primary Examiner

C. J. SECCURO, Assistant Examiner

U.S. Cl. X.R.

260—876 R, 876 B